Figure 1:
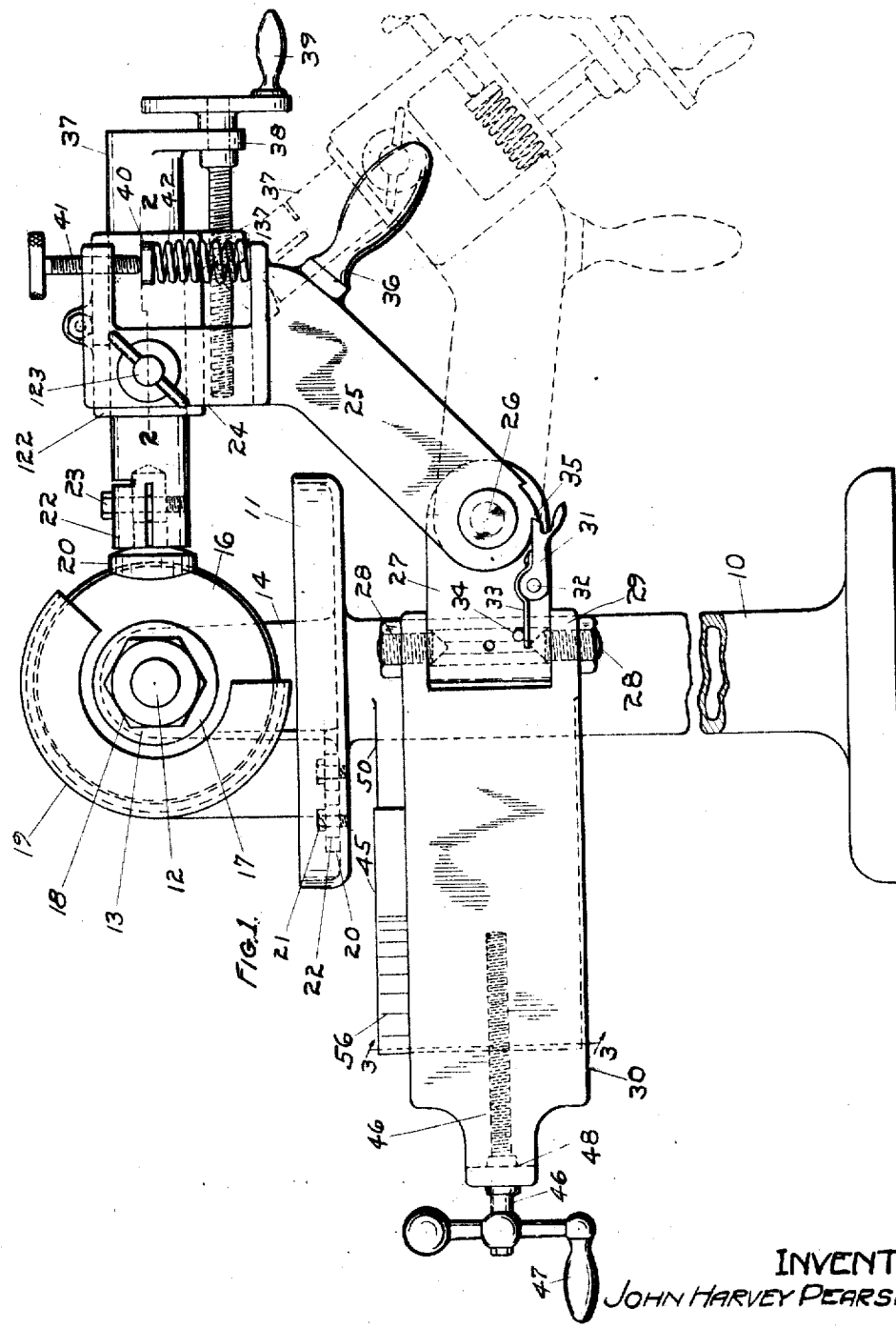

J. H. PEARSEN.
MACHINE FOR TRUING TORIC TOOLS.
APPLICATION FILED SEPT. 10, 1917.

1,287,091.

Patented Dec. 10, 1918.
3 SHEETS—SHEET 1.

INVENTOR
JOHN HARVEY PEARSEN

BY Lockwood + Lockwood
ATTORNEYS

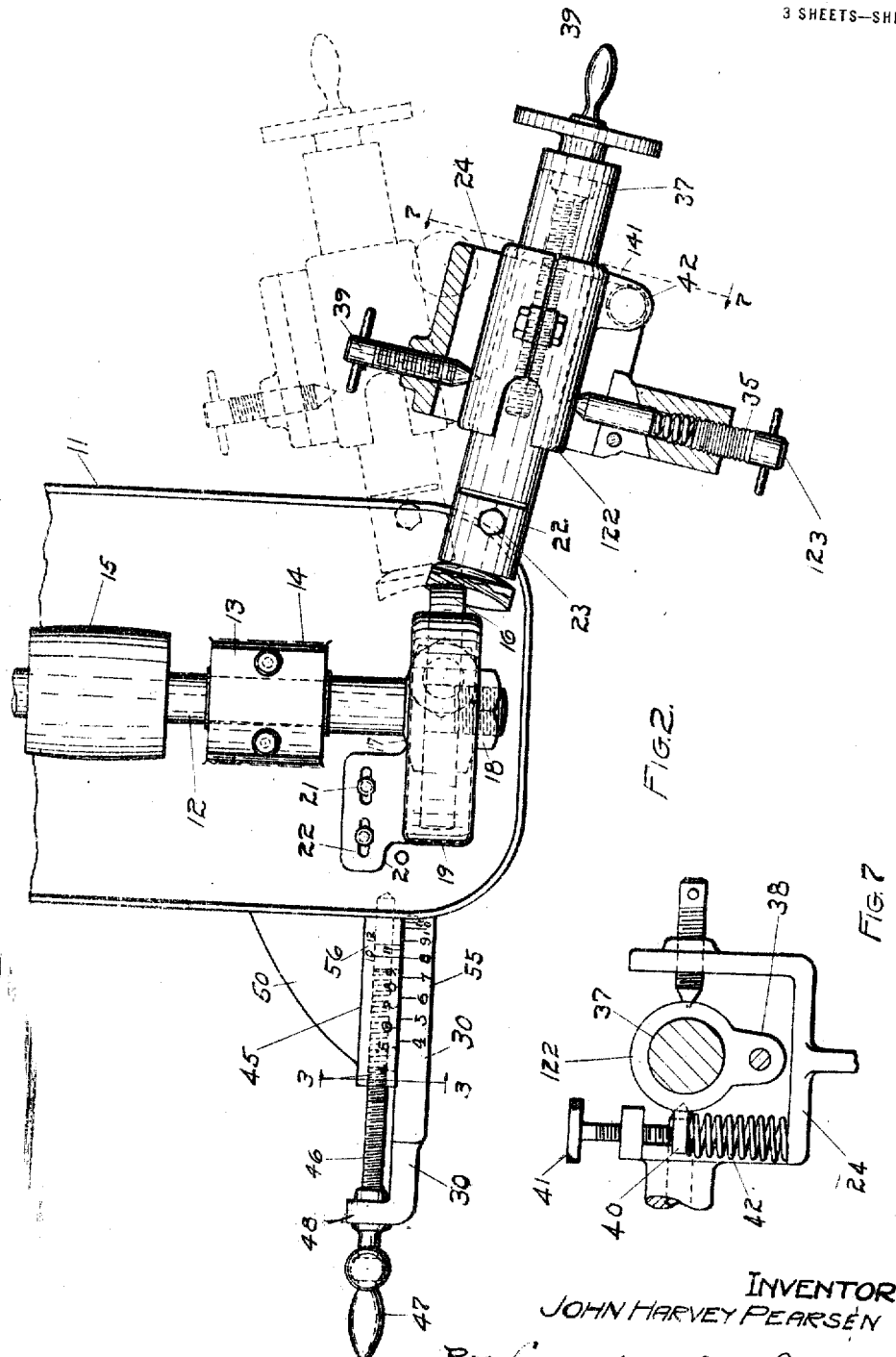

J. H. PEARSEN.
MACHINE FOR TRUING TORIC TOOLS.
APPLICATION FILED SEPT. 10, 1917.

1,287,091.

Patented Dec. 10, 1918.
3 SHEETS—SHEET 3.

INVENTOR
JOHN HARVEY PEARSEN

BY Lockwood + Lockwood
ATTORNEYS

UNITED STATES PATENT OFFICE.

JOHN HARVEY PEARSEN, OF INDIANAPOLIS, INDIANA, ASSIGNOR TO ONEPIECE BIFOCAL LENS COMPANY, OF INDIANAPOLIS, INDIANA, A CORPORATION.

MACHINE FOR TRUING TORIC TOOLS.

1,287,091.     Specification of Letters Patent.     Patented Dec. 10, 1918.

Application filed September 10, 1917. Serial No. 190,560.

*To all whom it may concern:*

Be it known that I, JOHN HARVEY PEARSEN, a citizen of the United States, and a resident of Indianapolis, county of Marion, and State of Indiana, have invented a certain new and useful Machine for Truing Toric Tools; and I do hereby declare that the following is a full, clear, and exact description thereof, reference being had to the accompanying drawings, in which like letters refer to like parts.

The object of this invention is to provide economical, rapid and convenient means for truing toric tools which are used in the manufacture of toric lenses for eye glass purposes.

A toric tool is a lens grinding tool having a double curved surface, that is, a surface with curvatures in two meridians at right angles to each other. Thus one meridian may have a curvature of eight diopters and the other meridian a curvature of ten diopters, according to the character of the lens desired to be made. Toric tools are made with lathes or like machines for operating upon metal. When the toric tools have been used somewhat, they wear so that the curvatures cease to be true and accurate. Therefore, toric tools must be frequently trued. Heretofore they have been trued on lathes or the same kind of machines employed in their manufacture in the first instance. That, however, is a very slow, tedious and expensive method.

The chief feature of the invention herein consists in arranging the machine with an emery wheel having a circumferential curvature of the same curvature as one of the desired meridians of the toric tool, and providing means for holding the base of the toric tool against the base of the emery wheel and horizontally oscillating it in an arc coinciding with the other meridian of the toric tool. Therefore, the curvature of the toric tool in one meridian is determined by the circumferential curvature of the emery wheel, while the curvature of the tool in the other meridian is determined by the arc of oscillation of the holder which holds the tool in operative engagement with the emery wheel and permits its horizontal oscillation across the face of the emery wheel.

Another feature of the invention consists of graduated means for adjusting the position of the tool holder so as to change its position with reference to the emery wheel and modify the degree of transverse curvature which the emery wheel would impart to the tool.

With this invention toric tools can be very quickly and cheaply trued. It takes only a very few minutes. This economical means for truing the tool is possible because the apparatus does not have to generate the surface of the tool and, therefore, has but very little grinding or generating work to do, merely correcting the inequalities in the surface of the tool which have arisen from its use. The amount of change necessary to true the tool makes it unnecessary to take it back to the lathe or other like machine and permits the object to be attained by the use of the simple, quickly and cheaply operated machine herein set forth.

Figure 5:
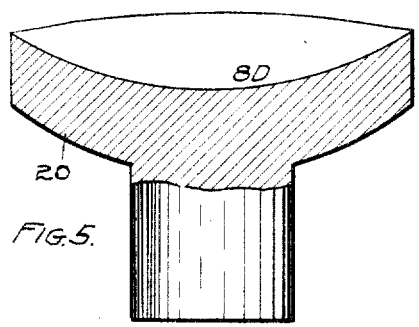
Figure 4:
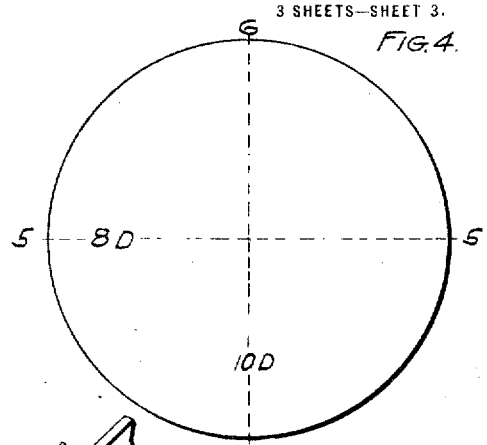
Figure 6:
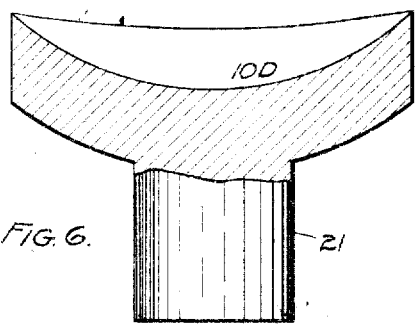
Figure 3:
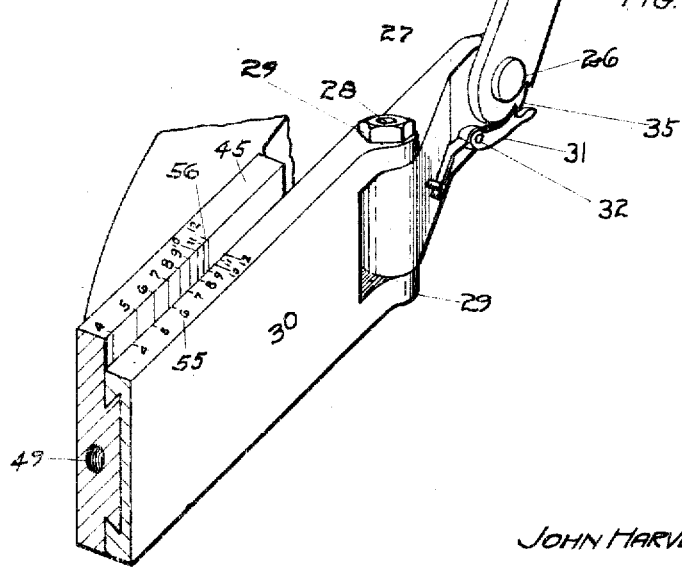

The full nature of the invention will be understood from the accompanying drawings and the following description and claims:

In the drawings, Figure 1 is a front elevation of the machine, the tool holder being shown by dotted lines thrown back in position for inserting a toric tool therein. Fig. 2 is a plan view of the machine, with a portion broken away and showing in dotted lines an altered position of the tool holder, and a part of the tool holder being shown in horizontal section on the line 2—2 of Fig. 1. Fig. 3 is a perspective view of a part of the tool holder, and means for the adjustable mounting thereof, the latter also being shown in vertical section on the line 3—3 of Fig. 1, with the adjusting screw removable. Fig. 4 is a plan view of the grinding surface of the toric tool with the two meridian lines shown by dotted lines and the curvature indicated by $8^B$ and $10^B$. Fig. 5 is an elevation of the tool with a portion in section along the line of the meridian 5—5 of Fig. 4. Fig. 6 is a similar figure showing a section through a portion of the tool on the meridian line 6—6 of Fig. 4. Fig. 7 is a section on the line 7—7 of Fig. 2.

The drawings herein show a stand 10 having a horizontal pan-shaped table 11 and above it a driving shaft 12 is mounted in a pair of bearings 13 on the upper ends of posts 14 which extend up from the table 12, only one of which, however, is shown, the other bearing being broken away. The shaft is driven by a belt, not shown, operating on a pulley 15 secured to the shaft.

An emery wheel 16 is mounted on the shaft 12 between a fixed disk 17 and a screw clamping disk 18, whereby it is held in place and it is protected by a hood 19 carried by a bracket 20 secured to the table 11 by bolts 21 which extend through slots 22 and permit adjustment of the hood for emery wheels of different diameters. As stated heretofore, the diameter of the emery wheel should be such as to give to it a circumferential curvature coinciding with the desired curvature of the tool in one meridian, say a curvature which will give the lens surface a curvature of eight diopters. When it is desired to true a tool of different curvatures the emery wheel should be removed and another one of the proper diameter should be substituted. It is seldom that any change of this kind is required because as a rule there are but few variations of curvatures in the great majority of toric tools.

A toric tool 20 is shown in Figs. 4, 5 and 6, that shown having a concave grinding surface with the curvature on the meridian 5—5 being 8 diopters, and the curvature on the meridian 6—6 being 10 diopters.

The toric tool has a shank 21 which is clamped in the head 22 of the tool holder by means of a bolt 23. The head 22 is mounted horizontally in a frame 24 at the upper end of an oblique bar 25 which is fulcrumed at 26 to an arm 27 that is pivoted by pins 28 between the ears 29 and a sliding bar 30. The arm 27, therefore, is horizontally oscillatable while the bar 25 is vertically oscillatory and is held in adjusted position by a pawl 31 which is fulcrumed to the arm 27 by a pin 32 and held by a spring 33 which is secured to said pawl and extends under a pin 34 on the arm 27, in engagement with the lower surface of the bar 25. This latter surface is provided with notches 35, one of said notches being arranged to hold the toric tool against the emery wheel for grinding it and the other notch in position to support the tool holder in the turned-down position shown by dotted lines in Fig. 1.

The head 22 is longitudinally adjustable in a sleeve 122 secured in the frame 24. The longitudinal adjustment is effected by a screw 37 screwing through an ear 137 and a set screw is loosely mounted in an ear 38 extending down from the head 22. The screw is operated by a handle 39.

In order that the tool holding head 22 may be absolutely in a horizontal position, during the operation of the machine, means for adjusting and holding it in such position is provided, consisting of pivots 123 for pivoting a sleeve 122 in the frame 24 so that it will be oscillated. A lug 40 extends from said sleeve 122 and a set screw 41 extends through an ear 141 from the upper part of the frame 24 in engagement with the lug 40. A spiral spring 42 is located between the lug 40 and the bottom of the frame 24. By the set screw 41, therefore, the head 22 can be brought into true horizontal position and maintained in such position regardless of the exact position of the frame 24 and bar 25.

The degree of curvature imparted to the toric tool in the horizontal meridian depends upon the relation between the position of the tool holding apparatus, with relation to the axis of the emery wheel. The degree of curvature is increased by moving the pivot of the tool holding frame to the right from the position shown in Fig. 1 and will be correspondingly increased and adjusted to the left of such position. This adjustment is effected by adjusting the position of the plate 30. As seen in Fig. 3, this plate is slidable on a stationary plate 45 by means of a screw 46 and handle 47. This screw extends loosely through the turned end 48 of plate 30 and screws into a hole 49 in the plate 45, which plate is rendered secure by an integral brace 50.

The desired position of the lens holding pivot or center of oscillation is indicated and determined by a series of graduations 55 on the plate 30 having numerals indicating the diopter or degree of curvature of the tool in horizontal meridian, in coöperation with a series of graduations 56 on the plate 45 with numerals indicating the diopters or degrees of curvature of the tool in vertical meridian. The plate 30 is adjusted so that the numerals indicating the curvatures in the two meridians will register with each other. This is shown in Fig. 3, where the machine is set to operate on a toric tool having a vertical curvature of 10 diopters and a horizontal curvature of 8 diopters.

The invention claimed is:

1. A machine for truing toric tools and the like having curvatures in two meridians, including an emery wheel having a circumferential curvature the same as the desired curvature of the tool in one meridian, tool holding means arranged to hold the tool to the emery wheel and be oscillatable transversely of the emery wheel in an arc agreeing with the desired curvature of the tool in its other meridian, means for altering the position of the center of oscillation of said tool holding means for changing the arc of oscillatory movement of the tool to adapt the tool holder for tools having varying degrees of curvature, and graduations for indicating the position of said center of oscillation for making such tools of varying curvatures.

2. A machine for truing toric tools and the like having curvatures in two meridians, including an emery wheel having a circumferential curvature the same as the desired curvature of the tool in one meridian, tool holding means arranged to hold the tool to the emery wheel and be oscillatable transversely of the emery wheel in an arc agreeing with the desired curvature of the tool in its other meridian, means for altering the position of the center of oscillation of said tool holding means for changing the arc of oscillatory movement of the tool to adapt the tool holder for tools having varying degrees of curvature, and two coöperating series of graduations for indicating the positions of said center of oscillation for various tools, one of said series of graduations representing the curvature of the tool in one meridian and the other series of graduations representing the curvature of the tool in the other meridian.

3. A machine for truing toric tools and the like having curvatures in two meridians, including an emery wheel having a circumferential curvature the same as the desired curvature of the tool in one meridian, means for holding the tool to the emery wheel, horizontal oscillatory means to which said tool holding means is pivoted so that the tool holding means can be moved toward and away from the emery wheel, said oscillatory means having a center of oscillation which will cause the tool in the tool holder to be oscillatable transversely of the emery wheel, and means for locking and holding said tool holding means in said oscillatory means in position for holding the tool against the emery wheel or throwing the tool holding means back out of the way for replacing a tool therein.

4. A machine for truing toric tools and the like having curvatures in two meridians, including an emery wheel having a circumferential curvature the same as the desired curvature of the tool in one meridian, means for holding the tool to the emery wheel, horizontal oscillatory means to which said tool holding means is pivoted so that the tool holding means can be moved toward and away from the emery wheel, said oscillatory means having a center of oscillation which will cause the tool in the tool holder to be oscillatable transversely of the emery wheel, and a spring pawl on said oscillatory means, the adjacent portion of said tool holding means having shoulders to be engaged by said pawl, one of said shoulders in position to cause the pawl to hold the tool holding means in working position and the other shoulder for holding the same in non-working position.

5. A machine for truing toric tools and the like, having curvatures in two meridians, including a frame, a shaft carried thereby, an emery wheel mounted on the shaft and tool holding mechanism, and a plate slidably mounted on said frame to which said tool holding mechanism is pivoted so as to render the tool oscillatable transversely of the emery wheel and thereby adapting the machine for resurfacing tools of various curvatures, graduations being provided for indicating the position at which such plate should be set for the resurfacing of a tool.

6. A machine for truing toric tools and the like having curvatures in two meridians, including a frame, a shaft carried thereby, an emery wheel mounted on the shaft and tool holding mechanism, a plate slidably mounted on said frame to which said tool holding mechanism is pivoted so as to render the tool oscillatable transversely of the emery wheel and thereby adapting the machine for resurfacing tools of various curvatures, a series of graduations being provided in said plate with numerals representing the curvature of the tool in one meridian, and graduations on said frame adjacent to the graduations on said plate with numerals representing the curvature of the tool in the other meridian, said graduations being so arranged that when said plate is set with the graduations representing the curvature of the tool in the two meridians registering with each other, the machine will probably resurface the tool having such curvatures.

7. A machine for truing toric tools and the like having curvatures in two meridians, including a frame, a shaft carried thereby, an emery wheel mounted on the shaft and tool holding mechanism, a plate slidably mounted on said frame to which said tool holding mechanism is pivoted so as to render the tool oscillatable transversely of the emery wheel and thereby adapting the machine for resurfacing tools of various curvatures, graduations being provided for indicating the position at which such plate should be set for the resurfacing of a tool, and means for sliding said plate and holding it in its adjusted position.

8. A machine for truing toric tools and the like having curvatures in two meridians, including an emery wheel having a circumferential curvature the same as the desired curvature of the tool in one meridian, and means for holding the tool to the emery wheel so that it will be oscillatable transversely of said wheel and the axis of the tool will always be in alinement with the center of the wheel.

9. A machine for truing toric tools and the like having curvatures in two meridians, including an emery wheel having a circumferential curvature the same as the desired curvature of the tool in one meridian, means for holding the tool to the emery wheel, and means for adjusting said tool holder and holding it so that the axis of the tool held thereby will always be in alinement with the center of the wheel.

10. A machine for truing toric tools and the like having curvatures in two meridians, including an emery wheel having a circumferential curvature the same as the desired curvature of the tool in one meridian, a tool holder for holding the tool against the emery wheel, a sleeve in which said tool holder is longitudinally movable, oscillatory means in which said sleeve is pivoted so that it can be brought in a direction at right angles to the oscillation of said oscillatory means, adjustable means for holding said tool holder in said sleeve in the desired position for work, and means for adjusting the position of the sleeve so that the tool holder will hold the tool with its axis in alinement with the center of the wheel.

11. A machine for truing toric tools and the like having curvatures in two meridians, including an emery wheel having a circumferential curvature the same as the desired curvature of the tool in one meridian, a tool holder for holding the tool against the emery wheel, a sleeve in which said tool holder is longitudinally movable, oscillatory means in which said sleeve is pivoted so that it can be brought in a direction at right angles to the oscillation of said oscillatory means, a setting screw operatively connecting said oscillatory means and said tool holding means for adjusting the tool holder longitudinally so as to hold the tool to its work, a lug extending laterally from said tool holder, a screw in said oscillatory means for engaging said lug and oscillating said sleeve to bring the tool holder in such position that the axis of the tool will be in alinement with the center of the wheel, and a spring acting between said oscillatory means and said lug for coöperating with said screw, substantially as shown.

In witness whereof I have hereunto affixed my signature.

JOHN HARVEY PEARSEN.

It is hereby certified that the name of the patentee in Letters Patent No. 1,287,091, granted December 10, 1918, for an improvement in "Machines for Truing Toric Tools," was erroneously written and printed as "John Harvey Pearsen," whereas said name should have been written and printed as *John Harvey Pearson;* and that the said Letters Patent should be read with this correction therein that the same may conform to the record of the case in the Patent Office.

Signed and sealed this 21st day of January, A. D., 1919.

[SEAL.]

F. W. H. CLAY,

*Acting Commissioner of Patents.*

Cl. 51—4.